US006295872B1

(12) United States Patent
Van Der Heide

(10) Patent No.: US 6,295,872 B1
(45) Date of Patent: Oct. 2, 2001

(54) ULTRASONIC MEASURING INSTRUMENT

(75) Inventor: Siemen Roelof Van Der Heide, Rotterdam (NL)

(73) Assignee: A Hak Industrial Services B.V. (NL)

( * ) Notice: Subject to any disclaimer, the term of this patent is extended or adjusted under 35 U.S.C. 154(b) by 0 days.

(21) Appl. No.: 09/403,610

(22) PCT Filed: May 6, 1998

(86) PCT No.: PCT/NL98/00253

§ 371 Date: Feb. 23, 2000

§ 102(e) Date: Feb. 23, 2000

(87) PCT Pub. No.: WO98/50906

PCT Pub. Date: Nov. 12, 1998

(30) Foreign Application Priority Data

May 7, 1997 (NL) .................................................. 1006007

(51) Int. Cl.[7] ................................ G01N 9/04; G01V 1/00

(52) U.S. Cl. ................................ 73/596; 73/587; 73/609; 73/620; 73/660; 367/35

(58) Field of Search .............................. 73/596, 587, 590, 73/609, 622, 623, 620, 660; 367/35, 32

(56) References Cited

U.S. PATENT DOCUMENTS

| | | | | |
|---|---|---|---|---|
| 3,504,759 | | 4/1970 | Cubberly, Jr. | 181/104 |
| 3,747,398 | * | 7/1973 | Rathburn et al. | 73/617 |
| 3,763,694 | * | 10/1973 | Rathburn et al. | 73/644 |
| 3,914,987 | * | 10/1975 | Bickel et al. | 73/609 |
| 4,255,798 | | 3/1981 | Havira | 367/35 |
| 4,361,044 | | 11/1982 | Kupperman et al. | 73/623 |

* cited by examiner

*Primary Examiner*—Hezron Williams
*Assistant Examiner*—Jacques Saint-Surin
(74) *Attorney, Agent, or Firm*—Akerman Senterfitt

(57) ABSTRACT

The invention relates to an ultrasonic measuring instrument comprising a housing which contains a transducer for transmitting and receiving ultra-sound waves, and a rotatable mirror placed inside the housing for directing ultra-sound waves coming from the transducer through a tapering window comprised in the housing to an object of measuring outside the housing, and for directing ultra-sound waves which are reflected by the object of measuring and which enter the housing through the window to the transducer. Around, and rotating with the mirror a tube is provided, comprising a recess for the passage of ultra-sound waves.

3 Claims, 1 Drawing Sheet

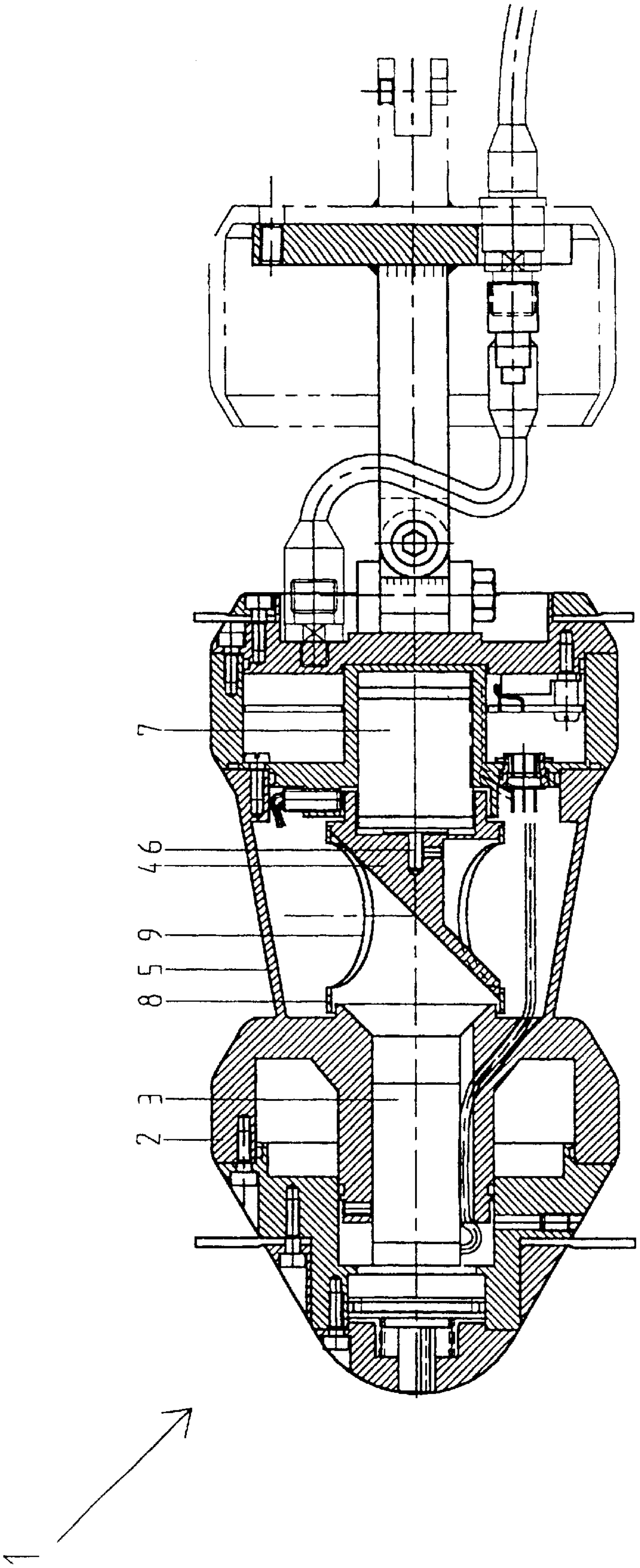
7
4
6
9
5
8
3
2
1

ULTRASONIC MEASURING INSTRUMENT

FIELD OF THE INVENTION

The invention relates to an ultrasonic measuring instrument comprising a housing which contains a transducer for transmitting and receiving ultra-sound waves, and a rotatable mirror placed inside the housing for directing ultra-sound waves coming from the transducer through a tapering window comprised in the housing to an object of measuring outside the housing, and for directing ultra-sound waves which are reflected by the object of measuring and which enter the housing through the window, to the transducer, whereby a tube is provided around, and rotating with the mirror, comprising a recess for the passage of ultra-sound waves.

BACKGROUND OF THE INVENTION

Such a measuring instrument is known and is used for the internal investigation of pipes. With this kind of inspection the reflection is used for one thing to derive the wall thickness of the pipe and for another thing to derive possible defects in the wall of the pipe. The ultra-sound waves employed for this purpose have a frequency spectrum from 2.5–10 MHz. To this end the known ultrasonic measuring instrument is provided with a transducer beaming in the longitudinal direction of the instrument's housing and whose sound waves are directed at an acoustic rotatable mirror which is placed at an angle of 45° with respect to the longitudinal axis of the instrument, which mirror reflects the sound waves radially through the window to the outside of the housing. The rotatable arrangement allows the pipe to be investigated over 360°. To effectuate rotation the mirror is mounted on the shaft of a motor.

U.S. Pat. No. 4,255,798 discloses an ultrasonic measuring instrument in accordance with the preamble of claim 1.

One problem of the known ultrasonic measuring instrument is that the window may produce reflections which under certain circumstances obscure the measurement at the object of measuring. The objective of the invention is to reduce the window's influence on the measuring result, and in general to make it possible to obtain a truer measurement at the object of measuring, in which interfering influences stemming from the measuring instrument as such, are greatly reduced.

SUMMARY OF THE INVENTION

To this end the ultrasonic measuring instrument in accordance with the invention is characterized in that the material for the window is polyoxylmethylene.

Generally the frequency with which the transducer beams at the object of measuring is selected in accordance with the pipe diameter to be measured, the type of wall, and the amount of dirt on the inside wall of the measuring object. The muffling effect provided by the window further reduces the amplitude of the fraction of the original transmission reflected by the window, which could otherwise have an unfavourable influence on the measurement at the measuring object.

The objective of the invention is also furthered in a method for ultrasonic measuring employing said instrument by selecting the thickness of the window material in correspondence to the thickness of the object of measuring from a group including thicknesses of about 2 mm and about 6 mm.

When measuring an object having a thickness of at least 7 mm, the recommended thickness of the window material is set at about 2 mm, and when measuring an object having a thickness of maximally about 7 mm, the thickness of the window material is set at about 6 mm. The advantages gained thereby can be explained as follows.

Compared with the reflection from an object of measuring having a relatively thick wall, a thin wall thickness means that the reflection time is much shorter and the amplitude of the reflection is higher. On the other hand, when measuring a relatively thin pipe, a thick window pane, i.e. the thickness of about 6 mm is preferable. Under these circumstances the ultra-sound waves have to travel a greater distance in the window material, as a result of which the reflection from the window is delayed, is reduced, and can consequently be distinguished more clearly from the reflection signal of the object of measuring.

Preferably the tube is provided with a second diametrically applied recess, so that the tube does not exhibit any imbalance during rotation.

BRIEF DESCRIPTION OF THE DRAWING

The invention will now be explained in more detail with reference to the drawing in which one single FIGURE shows the ultrasonic measuring instrument in accordance with the invention.

DETAILED DESCRIPTION OF THE EMBODIMENT

The FIGURE shows a longitudinal section of the ultrasonic measuring instrument in accordance with the invention. In general the ultrasonic measuring instrument is indicated with reference number 1 and comprises a housing 2 which housing 2 contains a transducer 3 for transmitting and receiving ultra-sound waves. The housing 2 further contains a rotatable mirror 4 for directing the ultra-sound waves coming from the transducer 3. To effectuate rotation the mirror 4 is mounted on the shaft 6 of an electric motor 7.

Through a window 5 in the housing 2 the ultra-sound waves are directed to an object of measuring located outside the housing 2. This object of measuring may be a tube of a pipe line whose thickness and possible irregularities have to be detected and determined.

Said longitudinal section of the ultrasonic measuring instrument 1 shows clearly that the window 5 is arranged such that the surface of the window tapers in the longitudinal direction of the housing 2. Both the ultra-sound waves leaving the housing 2 via the window 5, and the ultra-sound waves reflected by the object of measuring (not shown) and reentering the housing via the window 5, exhibit in principle a reflected wave due to the effect of the window 5. However, as a result of the window tapering preferably such that its surface forms an angle of approximately 10° with the longitudinal axis of the housing 2, the reflections are delayed in the window 5 longer than usual and in addition, said reflections are directed away from the mirror 4.

In addition, the measuring instrument 1 is provided with a tube 8 which is rotatable with the mirror 4 and positioned around the mirror 4. To effectuate rotation, the tube 8 is also coupled with the motor 7 which serves for the rotation of the mirror. The tube 8 is, in the mirror's 4 direction of investigation, provided with a recess 9 for the passage of the ultra-sound waves. Said recess 9 limits the free surface of the mirror 4 in the sense that possible reflections from the window 5 outside the surface of the recess 9, do not influence the measuring. In addition, the recess 9 allows better focusing of the ultrasonic signal.

The Ultrasonic measuring instrument 1 is preferably provided with a window made from a material which weakens the ultra-sound waves in the commonly applied frequency spectrum of 2.5–10 MHz. A preferred material is polyoxylmethylene. The thickness of said material is selected in correspondence to the thickness of the object of measuring from a group including thicknesses of about 2 mm and about 6 mm. When measuring an object having a thickness of about 7 to 8 mm, the material thickness is set at about 2 mm, and at about 6 mm when measuring an object having a thickness of maximally about 7 to 8 mm.

What is claimed is:

1. An ultrasonic measuring instrument comprising a housing which contains a transducer for transmitting and receiving ultra-sound waves, and a rotatable mirror placed inside the housing for directing ultra-sound waves coming from the transducer through a tapering window comprised in the housing to an object of measuring outside the housing, and for directing ultra-sound waves which are reflected by the object of measuring and which enter the housing through the window, to the transducer, whereby a tube is provided around, and rotating with the rotatable mirror, comprising a recess for the passage of ultra-sound waves, wherein the window is made from polyoxylmethylene.

2. A method for ultrasonic measuring employing an instrument in accordance with claim 1, wherein the thickness of the window is selected in correspondence to the thickness of the object of measuring from a group including window thicknesses of about 2 mm and about 6 mm.

3. The method for ultrasonic measuring in accordance with claim 2, wherein when measuring an object having a thickness of at least 7 mm, the recommended thickness of the window is set at about 2 mm, and when measuring an object having a thickness of maximally about 7 mm, the thickness of the window is set at about 6 mm.

* * * * *